Figure 1:
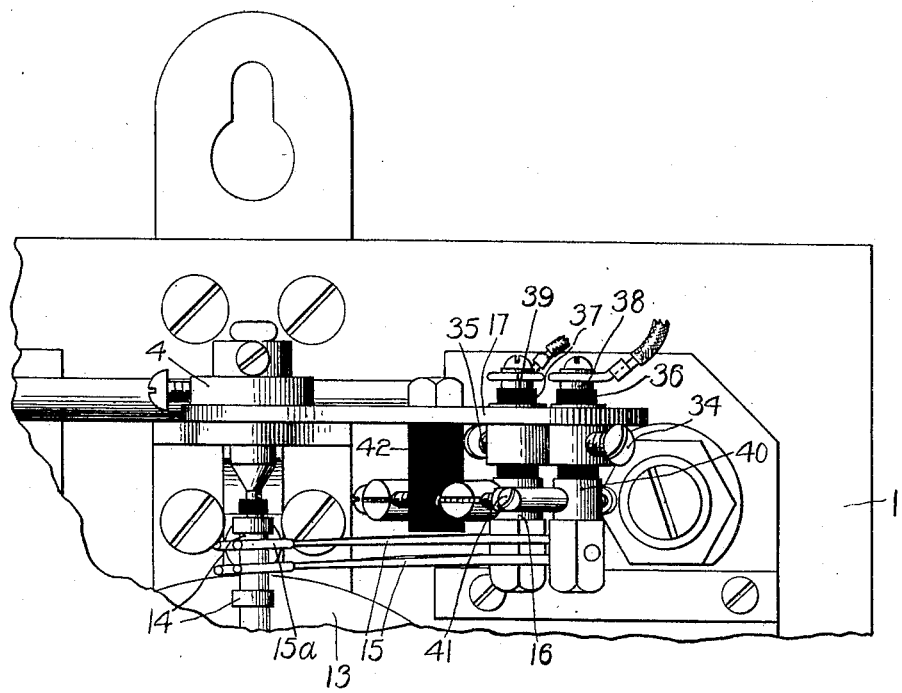

G. A. SCHEEFFER.
BRUSH HOLDER FOR ELECTRIC METERS.
APPLICATION FILED JAN. 14, 1910.

993,204.

Patented May 23, 1911.

2 SHEETS—SHEET 1.

Witnesses
George E. Higham.
Leonard E. Bogue.

Inventor
Gustave A. Scheeffer
By Brown Williams
Attorneys

G. A. SCHEEFFER.
BRUSH HOLDER FOR ELECTRIC METERS.
APPLICATION FILED JAN. 14, 1910.
993,204.
Patented May 23, 1911.
2 SHEETS—SHEET 2.
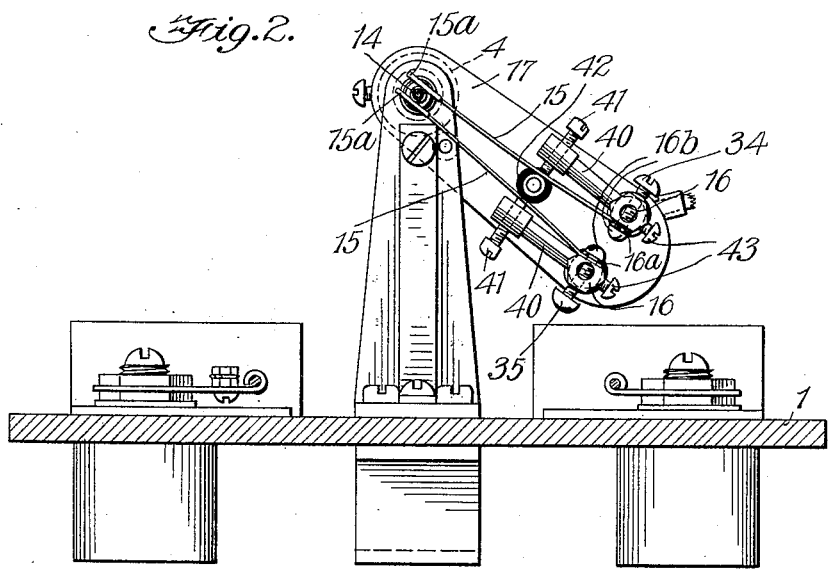
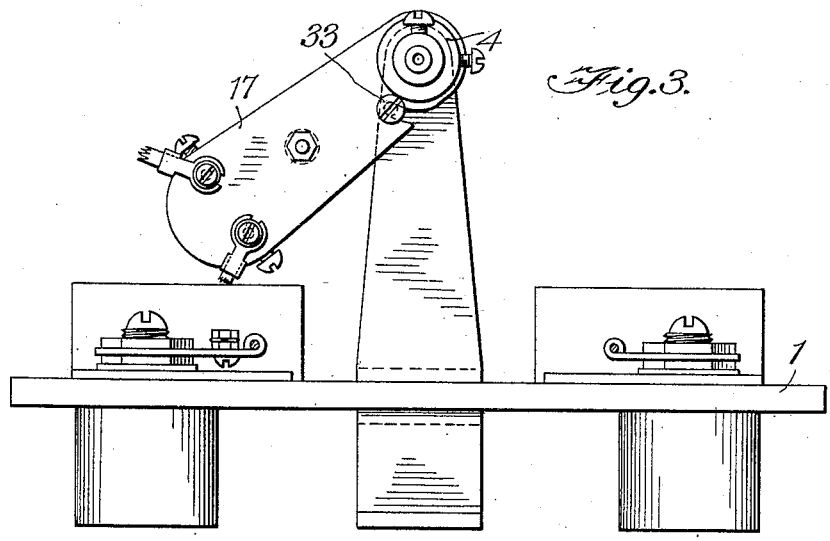
Witnesses:
L. W. Novander
George C. Higham.
Inventor:
Gustave A. Scheeffer
by Brown Williams
Attys.

UNITED STATES PATENT OFFICE.

GUSTAVE A. SCHEEFFER, OF INDIANAPOLIS, INDIANA, ASSIGNOR TO COLUMBIA METER COMPANY, OF INDIANAPOLIS, INDIANA, A CORPORATION OF INDIANA.

BRUSH-HOLDER FOR ELECTRIC METERS.

993,204.  Specification of Letters Patent.  Patented May 23, 1911.

Application filed January 14, 1910. Serial No. 538,027.

*To all whom it may concern:*

Be it known that I, GUSTAVE A. SCHEEFFER, a citizen of the United States, residing at Indianapolis, in the county of Marion and State of Indiana, have invented a certain new and useful Improvement in Brush-Holders for Electric Meters, of which the following is a full, clear, concise, and exact description, reference being had to the accompanying drawings, forming a part of this specification.

My invention relates to an improved form of electricity meters adapted to measure a quantity of electricity flowing through any given circuit.

My improved meter construction provides for accuracy of operation, ease of inspection and repair and durability of working parts.

My invention relates particularly to an improved form of brush holder construction for use with electric meters, such construction being adapted to facilitate the removal and replacing of the brushes without changing the proper adjustment of such brushes.

The several drawings illustrating my invention are as follows:

Figure 1 is a plan view of the meter mechanism complete with the casing thereof removed, and in this figure a portion of the field coil is broken away to show more clearly the armature windings and the starting coil. Fig. 2 is a detail view from below of the brush holder construction showing the manner of supporting the brush holders from the rocker arm which in turn is supported from the upper bearing of the armature shaft. Fig. 3 is a detail view from above of the rocker arm used to support the brush holders.

Similar numerals refer to similar parts throughout the several views.

As shown in the drawings, the base 1 supports an armature shaft 2 by means of a lower bearing 3 and an upper bearing 4. The shaft 2 carries near its lower end a disk 5 of nonmagnetic material disposed between the poles of permanent magnets 6 and 7 held in proper position by the brackets 8 and 9 secured to the base plate 1. The shaft 2 has mounted thereon three armature coils 10 disposed in operative relation to a field coil 11 supported by brackets 12 from the base plate 1. A starting coil 13 is also supported from the base 1 in suitable manner so as to occupy a position practically parallel with the field coil 11, the function of this starting coil being to exert a rotative tendency upon the armature windings to compensate for the friction of the moving parts. A commutator 14 is carried by the upper end of the armature shaft 2 and is connected with the windings 10. Brushes 15 are supported by brush holders 16 from the rocker arm 17 in such a manner as to rest upon the commutator 14. The rocker arm 17 is supported from the upper bearing 4 of the shaft 2. Main supporting posts 18 extend outwardly from and are rigidly secured to the base plate 1 and by means of arms 19 support a magnetic shield 20 between the permanent magnets 6 and 7 and the field coil and armature windings. The plate 20 has secured thereto a bracket 21 which forms the bearings for the worm wheel 22 engaging the worm 23 on the shaft 2. The posts 18 also serve to support at their outer ends suitable integrating mechanism adapted to be driven by the worm wheel 22 which integrating mechanism, however, is not here shown as its constitutes no part of this invention. Posts 25 and 26 extending outwardly from and rigidly secured to the base plate 1, are provided to secure the cover in place to protect the operating mechanism of the meter. A resistance coil 27 is disposed upon the post 26 as indicated, such resistance coil being connected in series with the armature as is the usual practice.

As shown in Figs. 2 and 3 the rocker arm 17 is rotatably supported by the upper bearing support of the shaft 2 and is adapted to be held in normal position indicated in Figs. 2 and 3 by means of the clamping screw 33. The rocker arm 17 has secured thereon by means of the clamping screws 34 and 35 insulating bushings 36 and 37 through which the studs 38 and 39 extend beyond the lower side of the rocker arm and the lower ends of these studs extending beyond the insulating bushings 36 and 37 receive the brush holders 16 which serve to support the brushes 15 above and below the commutator 14 of the armature. The brush holders 16 have arms 40 extending upwardly therefrom toward the commutator 14 and through their upper ends adjusting screws 41 extend in such a manner as to rest against the insulating stud 42 supported by the rocker arm 17 in such a manner as to lie between such screws. The brush holders 16 are held in any desired angular position by means of the clamping screws 43.

From the construction just described, it follows that by turning the screws 41 in or out, any desired spring tension may be exerted upon the brushes 15 and thus just the right pressure may be brought to bear upon the commutator 14. Furthermore, for this particular adjustment of the screws 41, by loosening the screws 43 the brush holders and brushes may be readily withdrawn from the supporting studs 38 and 39 for inspection or cleaning and upon being returned to such studs when the adjusting screws 41 are brought into contact with the stud 42 and the clamping screws 43 are turned into engagement with such studs the former adjustment of the brushes is secured without the exercise of the care usually required to make such adjustment. The brushes 15 consist of round rods of resilient conducting material having silver plated bearing ends 15$^a$ for resting upon the commutator 14 and their other ends are flattened to be engaged by the clamping members 16$^a$ by which they are secured to the brush holder 16 by the action of the screws 16$^b$.

While I have shown my brush holder construction in the particular embodiment herein shown, I do not wish, however, to be restricted to this particular construction, but desire to claim broadly equivalent constructions that may suggest themselves to those skilled in the art.

What I claim is:

1. In an electric meter, the combination of a rocker arm, brush holders rotatably supported by such rocker arm, adjustable stops carried by such brush holders and a common stop carried by the rocker arm and coöperating with the adjustable stops.

2. In an electric meter, the combination of a rocker arm, brush holders, studs carried by the rocker arm for rotatably supporting such brush holders, adjustable stops carried by the brush holders, and a common stop carried by the rocker arm for determining the position of the brush holders.

3. In an electric meter, the combination of a rocker arm, brush holders, studs carried by the rocker arm for rotatably supporting such brush holders, adjustable screw stops carried by such brush holders, a common stop of insulating material carried by such rocker arm and adapted to coöperate with such screw stops, and clamping screws carried by the brush holders adapted to engage such studs.

4. In an electric meter, the combination of a rotatable rocker arm, a fixed stop for determining the position of such rocker arm, brushes consisting of substantially straight round rods each of which is flattened at one of its ends, brush holders rotatably supported upon such rocker arm, such brush holders provided with clamps for engaging the flattened ends of the brushes, and fixed stops carried by the brush holders for determining the adjustment of the brushes.

5. In an electric meter, the combination of a support, a rocker arm rotatably carried by such support, a fixed stop carried by such support for determining the operating position of such rocker arm and for clamping such rocker arm in such position, brushes consisting of substantially straight metal rods silver plated at their contact ends and flattened at their other ends, brush holders provided with clamps for engaging the flattened ends of the brushes, studs carried by the rocker arm for rotatably supporting such brushes, adjustable screw stops carried by such brush holders, a common stop of insulating material carried by the rocker arm to coöperate with such screw stops, and clamping screws for securing the brush holders in their operative position.

6. In an electric meter, the combination of a rocker arm, brush holders removably supported by the rocker arm, a stop carried by each brush holder and a common stop carried by the rocker arm and adapted to coöperate with the brush holder stops, such stops serving to maintain the adjustment of the brush holders when one or more of them is removed from and replaced upon the rocker arm.

7. In an electric meter, the combination of a rocker arm, and brush holders carried by the rocker arm, each brush holder provided with a separate stop adapted to engage a stop carried by the rocker arm.

In witness whereof, I hereunto subscribe my name this 28th day of December, 1909.

GUSTAVE A. SCHEEFFER.

Witnesses:
ALBERT L. RABB,
JOHN E. SCOTT.

---

Copies of this patent may be obtained for five cents each, by addressing the "Commissioner of Patents, Washington, D. C."